June 13, 1933.    R. D. CLEMSON    1,913,534
SAW SET
Filed Oct. 6, 1930
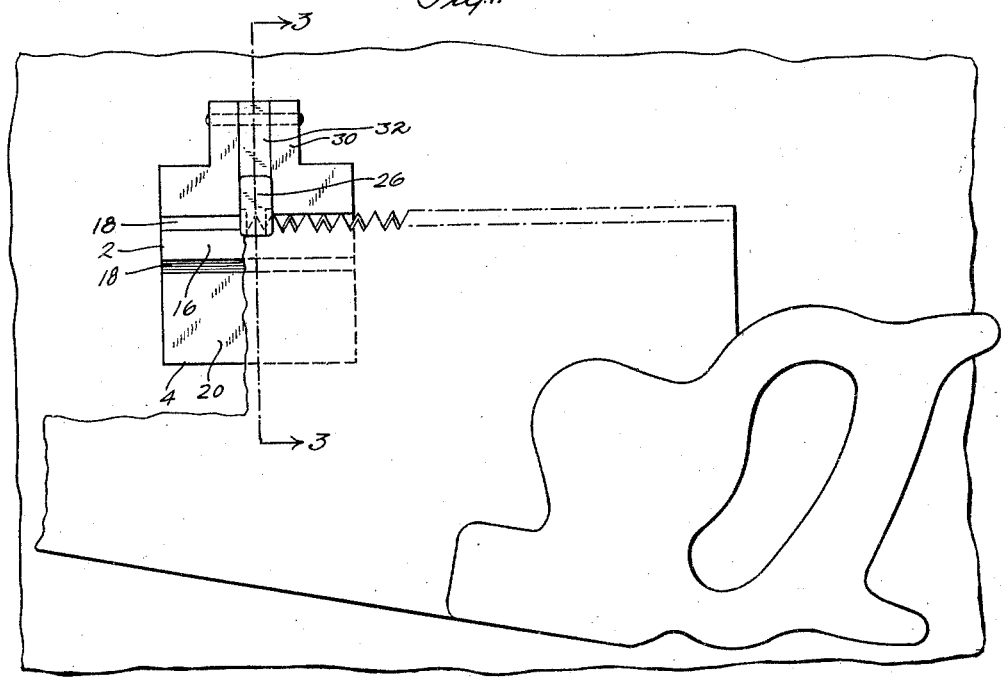
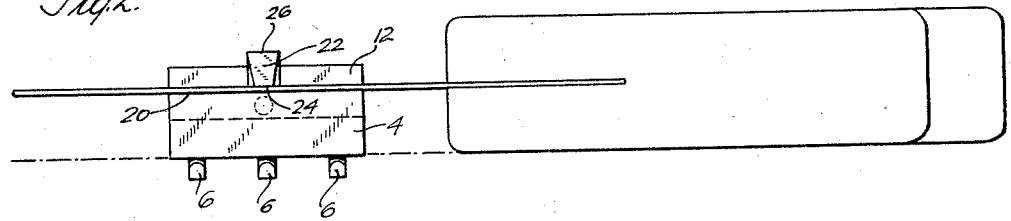
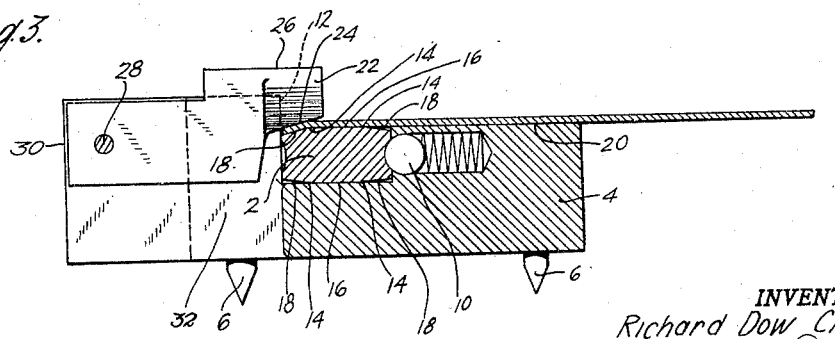
INVENTOR
Richard Dow Clemson
BY
ATTORNEYS Patented June 13, 1933

1,913,534

UNITED STATES PATENT OFFICE

RICHARD DOW CLEMSON, OF MIDDLETOWN, NEW YORK, ASSIGNOR TO CLEMSON BROTHERS, INC., OF MIDDLETOWN, NEW YORK, A CORPORATION OF NEW YORK

SAW SET

Application filed October 6, 1930. Serial No. 486,542.

This invention relates to saw sets and it has for its general object the provision of a simple, easily manipulated and operated saw set which will enable comparatively unskilled workmen substantially to duplicate the setting operations performed upon saws at the time of their manufacture.

The usual method of setting the teeth of a saw at the time of its manufacture is to give to each tooth the required set by delivering to it a hammer blow, a method that has heretofore required the services of a highly skilled workman. This method of setting a saw, however, has continued to be employed in the manufacture of saws because the set thus produced is the most permanent and satisfactory.

When, however, a saw comes into the hands of a carpenter or other workman who uses it and who usually takes care of resharpening and setting the teeth thereof, this workman rarely, if ever, possesses the skill to set the saw teeth in the manner in which they have been set at the time of manufacture of the saw and therefore various tools have been provided for the use of such workmen in setting saw teeth. Few of these tools effect even an approximation of the setting method employed in the manufacture of saws.

As above stated, therefore, a general object of the invention is to provide an improved saw set that will permit the carpenter or other workman who is refitting his saw to effect the setting of the teeth thereof in a way that substantially duplicates the method and the results of the method employed in the saw factory.

A particular object of the invention is to provide a comparatively inexpensive, durable and easily manipulated and operated saw set that can be utilized with very simple adjustments to effect the desired set on quite a large range of saws as to tooth design and point number.

Other objects and important features of the invention will appear from the following description and claims when considered in connection with the accompanying drawing, in which Figure 1 is a plan view of a saw set embodying the present invention showing a saw in position therein;

Figure 2 is a front elevation, and

Figure 3 is a vertical section on the line 3—3 of Figure 1.

In the illustrative embodiment of the invention, a removable anvil 2 is mounted in the base member 4 of the structure, which has pointed projections 6 that may be driven into the bench or other place where it is desired to use the saw set so as to hold it stationary, the anvil 2 fitting in a groove 8 in the base member 4 and being so shaped that it may be reversed either lengthwise or crosswise and still fit the groove, the side edges of the anvil being slightly concave so that they cooperate with a locking ball 10 spring pressed into the groove 8 on that side of the groove remote from the tooth-positioning gage 12 formed as a flange on one side of the base 4.

The anvil 2 is provided with four setting edges 14, formed, two on each side of the anvil, by the intersection with the blade-supporting face 16 of the anvil of set-limiting faces 18 inclined to the face 16 at the desired angles of set, one of these setting edges 14 being in such relation to the gage 12 in each position of the anvil that when the point of the saw tooth to be set abuts against the gage 12 the setting edge 14 will be at the desired point of bend of the tooth to be set and the face 18 on the gage side of the setting edge will limit the amount of set of the tooth.

When the anvil 2 is in position in the groove 8 of the base 4, the blade-supporting surface 16 of the anvil will preferably be in the same plane as the upper face 20 of the base 4 which thus forms an extension of the blade-supporting surface of the anvil. Moreover, the base 4 will preferably be of such thickness from top to bottom that when the pointed studs or projections 6 are driven into the bench or other supporting surface the supporting faces 16 and 20 will be at a height above the bench or other support for the saw handle equal to the thickness of the saw handle below the blade, thus permitting the saw blade to rest in substantially a flat position on the blade-supporting surface, without special support for the handle.

Cooperating with the setting edge 14 to bend the tooth over said edge, in the illustrative embodiment of the invention, is a setting member 22 having a tooth-engaging face 24 which lies substantially parallel to the set-limiting face 18 of the anvil 2 when it has operated to bend the saw tooth into set condition, said setting member being preferably provided with an impact-receiving face 26 on its side opposite the tooth-engaging face 24 so that when struck a hammer blow on the face 26 the member 22 will transmit the impact to the saw tooth projecing over the setting edge 14 and bend this tooth down against the set-limiting face 18, the setting operation thus being substantially equivalent to a hammer blow delivered directly upon the tooth to be set.

In order to support the setting member 22 and to guide it in its setting movements, in the illustrative embodiment of the invention the setting member 22 is pivoted to rock about a shaft 28 carried between ears 30 formed on the base 4 upon each side of a slot 32 extending through the gage 12, in which slot and between which ears the setting member 22 moves and is guided in effecting its saw-setting movements.

It will be noted that the tooth-engaging face 24 of the setting member 22 is inclined to the blade-supporting face 16 of the anvil as well as to the blade-supporting face 20 of the base 4 at an angle approximating the desired angle of set so that it will present a substantial bearing surface upon the tooth when performing the setting operation and will thus cooperate more effectively with each of the set-limiting faces 18. Preferably this angle of inclination is at least equal to the greatest angle of inclination of any of the set-limiting faces 18 to the blade-supporting face 16.

It will be noted from an inspection of Fig. 3 that the setting member 22 projects sufficiently over the anvil 2 so that its tooth-engaging face 24 projects beyond the setting edge 14 of the anvil a substantial distance. The purpose of this is to avoid the necessity for using a spring or other means for moving the setting member away from the anvil when inserting a saw tooth beneath the setting member, it being merely necessary to insert the point of the tooth between the blade-supporting face 16 of the anvil and the tooth-engaging face 24 of the setting member. Thus, regardless of the thickness of the saw blade, the setting member 22 will rest directly upon the tooth to be set before the hammer blow is struck, which insures the uniform transmission of the hammer blow and a uniform set to successive teeth.

It will be understood that the invention is not restricted to the illustrative embodiment but that many modifications may be made without departing from the fundamental concept, the scope of which is defined in the claims.

What is claimed as new is:

1. A saw set comprising a base having a blade-supporting face, a reversible anvil mounted in a recess in said base and having blade-supporting faces on its opposite sides each having two setting edges formed by the intersections with said respective blade-supporting faces of inclined set-limiting faces formed on said anvil, a recess in said base in which said anvil is mounted, said recess being shaped and positioned to locate and maintain either blade-supporting face of the anvil in substantially the same plane as the blade-supporting faces of the base, a gauge formed by the extension of one face of the recess for engaging the toothed edge of a saw to locate the same with relation to the operative setting edge and set-limiting face of the anvil, and a setting member pivoted on said base and having a tooth engaging face for engaging a saw tooth projecting over the operative setting edge of the anvil and bending said tooth into set condition, said setting member having its tooth-engaging face arranged to contact with the anvil when no saw is in the set and extending beyond the setting edge to form, with the blade-supporting face of the anvil, an angular entrance for the insertion of a saw tooth between the anvil and the setting member.

2. A saw set comprising a base having a blade-supporting face, a reversible anvil mounted in a recess in said base and having blade-supporting faces on its opposite sides each having two setting edges formed by the intersections with said respective blade-supporting faces of inclined set-limiting faces formed on said anvil, a recess in said base in which said anvil is mounted, said recess being shaped and positioned to locate and maintain either blade-supporting face of the anvil in substantially the same plane as the blade-supporting faces of the base, a gauge formed by the extension of one face of the recess for engaging the toothed edge of a saw to locate the same with relation to the operative setting edge and set-limiting face of the anvil, a setting member pivoted on said base and having a tooth engaging face for engaging a saw tooth projecting over the operative setting edge of the anvil and bending said tooth into set condition, said setting member having its tooth-engaging face arranged to contact with the anvil when no saw is in the set and extending beyond the setting edge to form, with the blade-supporting face of the anvil, an angular entrance for the insertion of a saw tooth between the anvil and the setting member, and a yieldingly actuated locking device for removably locking the anvil in the recess.

Signed at Middletown, New York, this 30th day of September, 1930.

RICHARD DOW CLEMSON.